United States Patent
Shi et al.

(10) Patent No.: US 10,528,777 B2
(45) Date of Patent: Jan. 7, 2020

(54) SYSTEM AND METHOD FOR RECOGNIZING ORIENTATION OF AN OBJECT PLACED ON AN INTERACTIVE SURFACE

(71) Applicants: Zheng Shi, Beijing (CN); Hanyin Ye, Beijing (CN)

(72) Inventors: Zheng Shi, Beijing (CN); Hanyin Ye, Beijing (CN)

( * ) Notice: Subject to any disclaimer, the term of this patent is extended or adjusted under 35 U.S.C. 154(b) by 0 days.

(21) Appl. No.: 16/124,212

(22) Filed: Sep. 7, 2018

(65) Prior Publication Data

US 2019/0018988 A1    Jan. 17, 2019

Related U.S. Application Data

(63) Continuation-in-part of application No. PCT/CN2017/076346, filed on Mar. 10, 2017.

(30) Foreign Application Priority Data

Mar. 10, 2016  (CN) .......................... 2016 1 0136885

(51) Int. Cl.
| | |
|---|---|
| *G06K 7/00* | (2006.01) |
| *G06K 7/10* | (2006.01) |
| *G06K 19/077* | (2006.01) |
| *G01D 5/24* | (2006.01) |

(52) U.S. Cl.
CPC ....... *G06K 7/10366* (2013.01); *G06K 19/077* (2013.01); *G01D 5/24* (2013.01)

(58) Field of Classification Search
USPC .............. 235/375–385, 435–451; 705/22, 28
See application file for complete search history.

(56) References Cited

U.S. PATENT DOCUMENTS

| | | | | |
|---|---|---|---|---|
| 5,671,362 A | * | 9/1997 | Cowe | G06Q 10/087 340/5.92 |
| 6,690,156 B1 | | 2/2004 | Weiner et al. | |
| 9,406,187 B2 | * | 8/2016 | Hammonds | G06Q 20/203 |
| 2006/0246403 A1 | | 11/2006 | Monpouet et al. | |

FOREIGN PATENT DOCUMENTS

| | | |
|---|---|---|
| CN | 101869766 | 10/2010 |
| CN | 203677917 | 7/2014 |

OTHER PUBLICATIONS

SIPO: International Search Report for PCT Application No. PCT/CN2017/076346 filed Mar. 10, 2017, dated May 31, 2017.

* cited by examiner

*Primary Examiner* — Jamara A Franklin

(57) ABSTRACT

The present invention provides a system and accompanying method for recognizing orientation of an object placed on an interactive surface. The system includes an interactive surface, a processor operatively linked to the interactive surface, an array of sensors operatively linked to the processor, and an object that has multiple external sides. Each of the external sides is visually marked with an indicator. Once the object is placed on the interactive surface, the array of sensors detects an identification value of the external side that is in touch with the interactive surface and transmits the identification value to the processor, and the processor derives the orientation of the object based on the identification value.

8 Claims, 3 Drawing Sheets

SYSTEM AND METHOD FOR RECOGNIZING ORIENTATION OF AN OBJECT PLACED ON AN INTERACTIVE SURFACE

CROSS-REFERENCE TO RELATED APPLICATION

This application is a continuation in part of International Patent Application No. PCT/CN2017/076346, entitled "System and Method for Recognizing Orientation of an Object Placed on an Interactive Surface", filed on Mar. 10, 2017, which claims priority of Patent Application CN2016101368857, entitled "System for Recognizing Orientation of an Object Placed on an Interactive Surface", filed on Mar. 10, 2016. The entire disclosure of the above application is incorporated herein by reference.

TECHNICAL FIELD

The present invention provides a system and the accompanying method for recognizing the orientation of an object placed on an interactive surface. The present invention relates to the radio frequency identification (RFID) technology and the capacitive sensing technology.

BACKGROUND

For games played on an interactive surface, especially those board games, it is difficult for processors and sensors to identify orientation of game pieces, for example, to determine that a card is laid face up or face down on a table. During gameplay, usually players have to take care of the game pieces manually, which increases their workload. Thus, the intelligence of the games is desired to be significantly improved.

SUMMARY OF THE INVENTION

Aiming to solve the problems above, the present invention provides a system for recognizing orientation of an object placed on an interactive surface. The system includes an interactive surface, a processor operatively linked to the interactive surface, an array of sensors operatively linked to the processor, and an object that has multiple external sides. Each of the external sides is visually marked with an indicator. Once the object is placed on the interactive surface, the array of sensors detects an identification value of the external side that is in touch with the interactive surface and transmits the identification value to the processor, and the processor derives the orientation of the object based on the identification value.

In accordance with one embodiment of the present invention, the external side of the object contains an electrically poorly conductive material, the array of sensors is an array of capacitive sensors, and the identification value is a set of capacitance values. The electrically poorly conductive material contributes to differences in capacitance detected by the multiple sensors in the array as a result of differences in the pattern and thickness of the electrically poorly conductive material distributed throughout the external side of the object. The electrical resistance of the electrically poorly conductive material has been set within a certain range such that the external side not in touch with the interactive surface can also capacitively couple with the array of sensors, via the electrically poorly conductive material, upon a touch of an external object such as a finger with the object. The range of the electrical resistance of the electrically poorly conductive material is subject to parameters such as the pattern and the thickness of the electrically poorly conductive material, which is not limited in the present invention.

In accordance with one embodiment of the present invention, the object includes a first external side made with regular plastic, and a cap made with electrically poorly conductive material that forms a second external side and encompasses the edge of the first external side. Once the first external side is in contact with the interactive surface, the electrically poorly conductive material that encompasses the edge of the first external side is also in contact with the interactive surface.

In accordance with one embodiment of the present invention, each external side of the object is embedded with an RFID tag, the array of sensors is an array of RFID readers, and the identification value is the ID of an RFID tag. Each RFID tag is partially shielded with an electromagnetic shield. Once an external side is in contact with the interactive surface, only the RFID tag embedded in that particular external side is detected by the RFID reader.

In accordance with one embodiment of the present invention, the electromagnetic shield could be electromagnetic wave-absorbing material, metal sheets, or conductive plastic sheets.

In accordance with one embodiment of the present invention, the system further includes a memory and an output module. The memory is configured to store the information of the RFID tags, the identification values of each external side, the orientation information of each external side, the output information of the output module, and correlation relationships between and among the information.

The present invention provides a method for recognizing orientation of an object on an interactive surface, as follows:
   placing an object on an interactive surface, and the object includes multiple external sides, and each external side is visually marked with an indicator;
   detecting, by an array of sensors, an identification value of the external side in touch with the interactive surface;
   transmitting, by the array of sensors, the identification value to the processor;
   deriving, by the processor, the orientation of the object based on the identification value.

In accordance with one embodiment of the present invention, the processor directs output module to provide the output information based on the orientation of the object.

The system and accompanying method disclosed in the present invention enables the system to automatically recognize the orientation of an object placed on an interactive surface, improves the intelligence of the system and reduces the workload of players. Once the present invention is applied in games played on interactive surfaces, the games will be of more fun.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are only for exemplary embodiments of the present invention, and that a person of ordinary skill in the art may derive additional drawings without deviating from the principles of the present invention.

DETAILED DESCRIPTION OF THE INVENTION

Reference will now be made in detail to various embodiments of the invention illustrated in the accompanying drawings. While the invention will be described in conjunction with the embodiments, it will be understood that this is not intended to limit the scope of the invention to these specific embodiments. The invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

Figure 1:
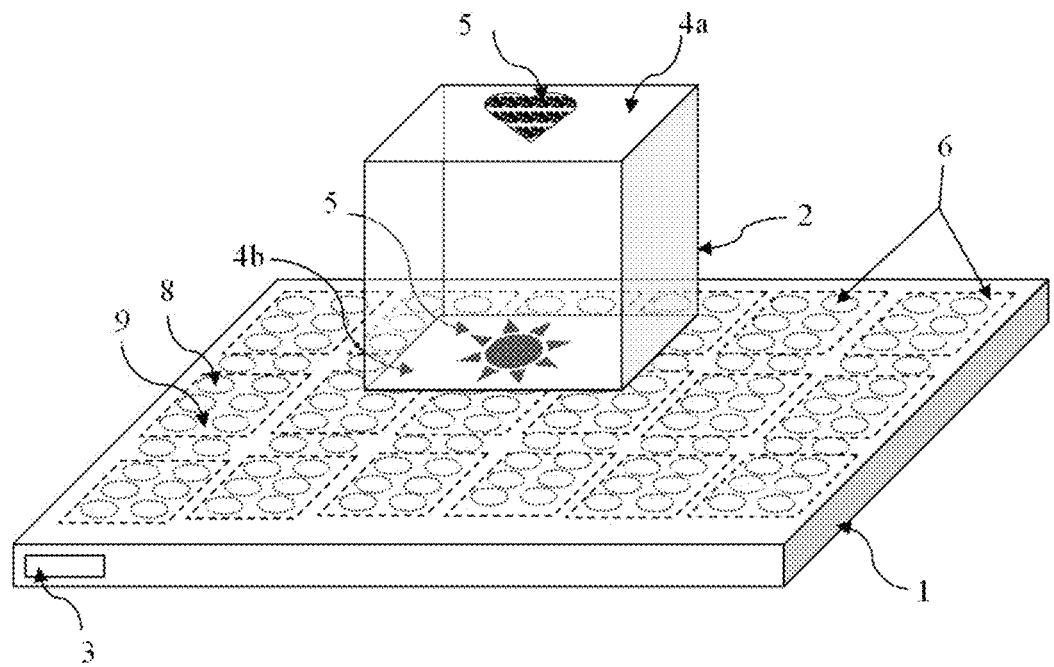
FIG. 1 is a schematic diagram illustrating the system for recognizing orientation of an object placed on an interactive surface in accordance with one embodiment of the present invention.

The present invention discloses a system for recognizing orientation of an object placed on an interactive surface. FIG. 1 is a schematic diagram illustrating the system in accordance with one embodiment of the present invention. The system includes an interactive surface 1, an object 2, a processor operatively linked to the interactive surface 1, an array 6 of sensors operatively linked to the processor, a memory operatively linked to the processor, and an output module 3 operatively linked to the processor. Once the object 2, such as a chess piece, is placed on the interactive surface 1, such as an electronic chess board, the chess piece touches multiple sensors of the array 6, and thus is detected by these sensors 6. If an external sides, e.g., 4a or 4b, of the chess piece is placed at different locations of the board for multiple times, the processor will get a set of identification values generated from the inductive coupling and store the identification values in the memory, in order to establish a correlation relationship between the identification values and the external side. And when the chess piece is once again placed on the electronic chess board, with one specific external side in touch with the board, the processor can recognize this external side based on the set of the identification values measured and stored previously. If the same process is repeated for every external side of the chess piece, different external sides of the chess piece can be recognized through the detection of the different identification values.

The overall scheme is as follows:

As shown in FIG. 1, the object 2 has multiple external sides 4, including but not limited to external side 4a and external side 4b. Once an external side 4 is detected by the sensors as the object is placed on the interactive surface 1, the processor obtains the identification value of the external side 4. Each external side 4 is visually marked with an indicator 5, such as heart and sun, in correspondence with different identification values.

The memory is stores the identification values of each external side 4, the orientation information of each external side 4 (e.g., upwards or downwards), the output information (such as an audio file) of the output module 3 (e.g., an audio player), and the correlation relationships between and among the information.

Once the object 2 is placed on the interactive surface 1, the array 6 of sensors detects the identification value of the external side 4 in touch with the interactive surface 1 and transmits the identification value to the processor, and the processor is derives the orientation of the object 2 based on the identification value and further directs the output module 3 to provide the corresponding output information.

Figure 2:
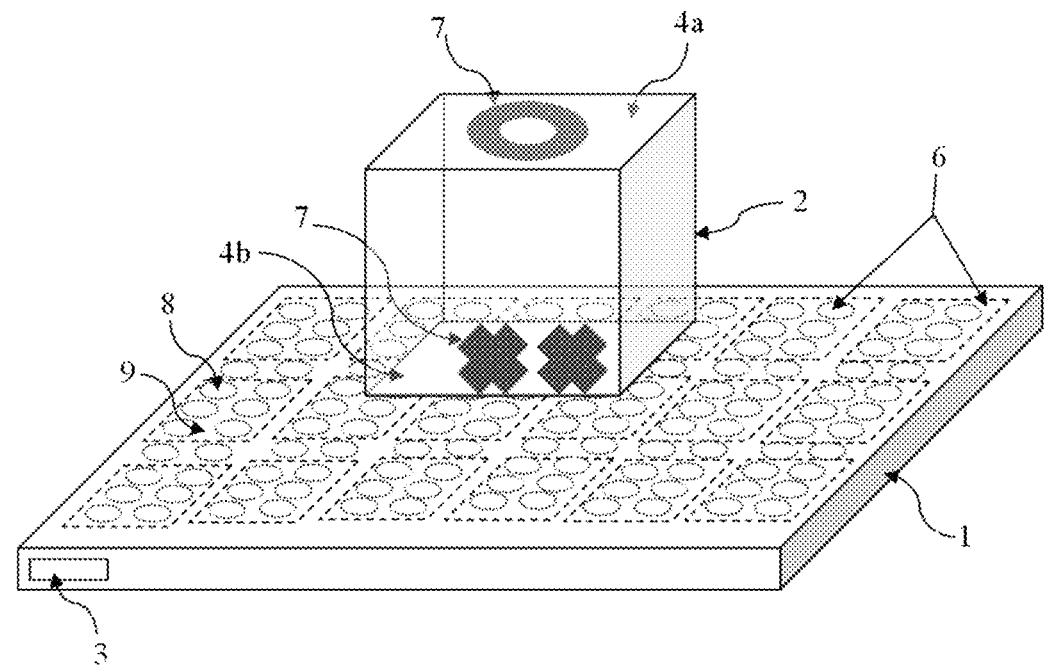
FIG. 2 is a schematic diagram illustrating the electrically poorly conductive material contained in an external side of the object in accordance with one embodiment of the present invention.

As shown in FIG. 2, the external side 4 of the object 2 contains an electrically poorly conductive material 7, the array 6 of sensors is an array of capacitive sensors, and the identification value is a set of capacitance values. The electrically poorly conductive material 7 contributes to differences in capacitances detected by multiple sensors due to differences in the pattern and thickness of the electrically poorly conductive material 7 distributed throughout the external side 4 of the object 2. For example, the pattern of the external side 4a is 0, whereas the pattern of the external side 4b is XX. The pattern and thickness of the electrically poorly conductive material 7 is set differently, and thus different external sides 4 placed on the interactive surface will generate different capacitive coupling values, making each external side unique.

It is noted that the electrical resistance of electrically poorly conductive material 7 is in a certain range. The range should allow an external side 4 not in touch with the interactive surface 1 to capacitively couple with the array 6 of sensors, via the electrically poorly conductive material, upon a touch of an external object, such as a finger, with this external side 4 the object 2. The range of the electrical resistance of the electrically poorly conductive material is subject to parameters such as the pattern and the thickness of the electrically poorly conductive material, which is not limited in the present invention.

When the array 6 of sensors is array of capacitive sensors 8 (as shown in FIGS. 1-5), and the different identification values are different capacitive coupling values generated by different external sides 4 placed on the interactive surface 1, and the processor recognizes different external sides 4 based on the identification values.

Figure 4:
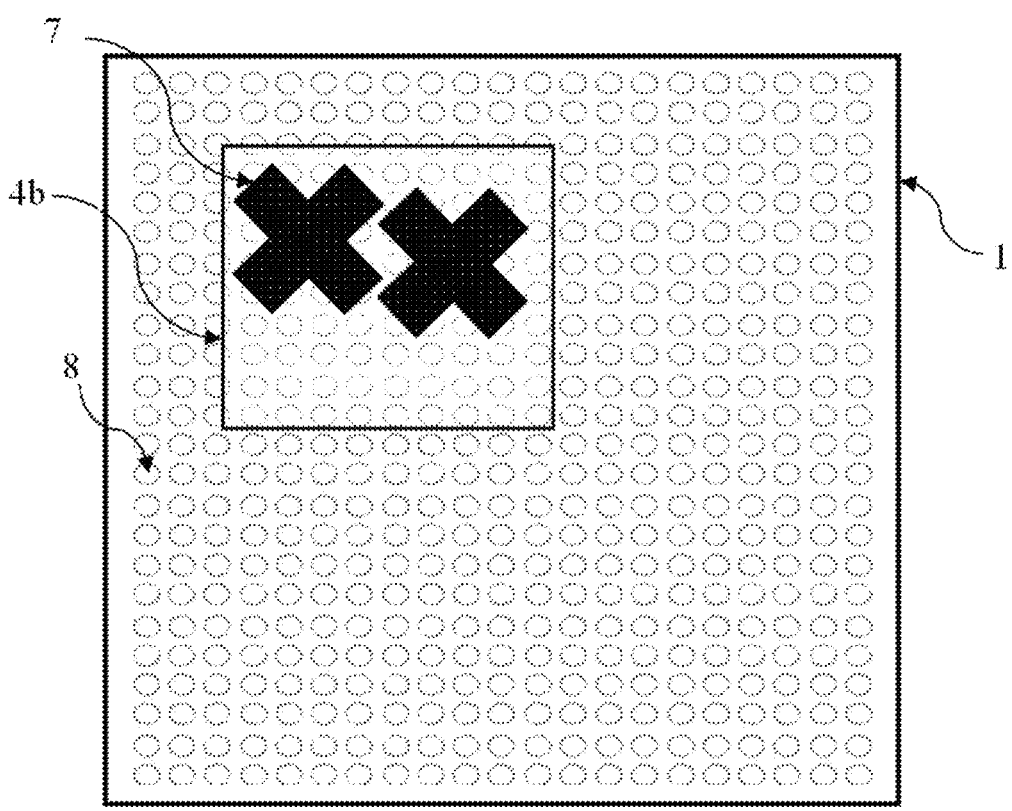
FIG. 4 is the bird's-eye view of FIG. 2, in accordance with one embodiment of the present invention.

In other words, if the array 6 of sensors is array of capacitive sensors 8, and an external side 4 (such as external side 4b) of the object 2 is in touch with interactive surface 1 in the orientation shown in FIG. 2, due to the electrically poorly conductive material 7 with the XX pattern on the external side 4b, the array of capacitive sensors 8 reads a set of capacitive coupling values. Referring to FIG. 4, the bird's-eye view of FIG. 2, it is clearly shown that, if the chess piece is placed at different locations of the chess board, a set of identification values will be generated, which determines a specific attributes of the chess piece (for example, an average identification value). And the average identification value is closely related to the pattern and the thickness of the electrically poorly conductive material 7 contained in this specific external side. If the pattern and thickness of the electrically poorly conductive material 7 is changed, the capacitive couple value detected by the array of capacitive sensor 8 will also change, which confirms the uniqueness of each external side of the chess piece.

Figure 5:
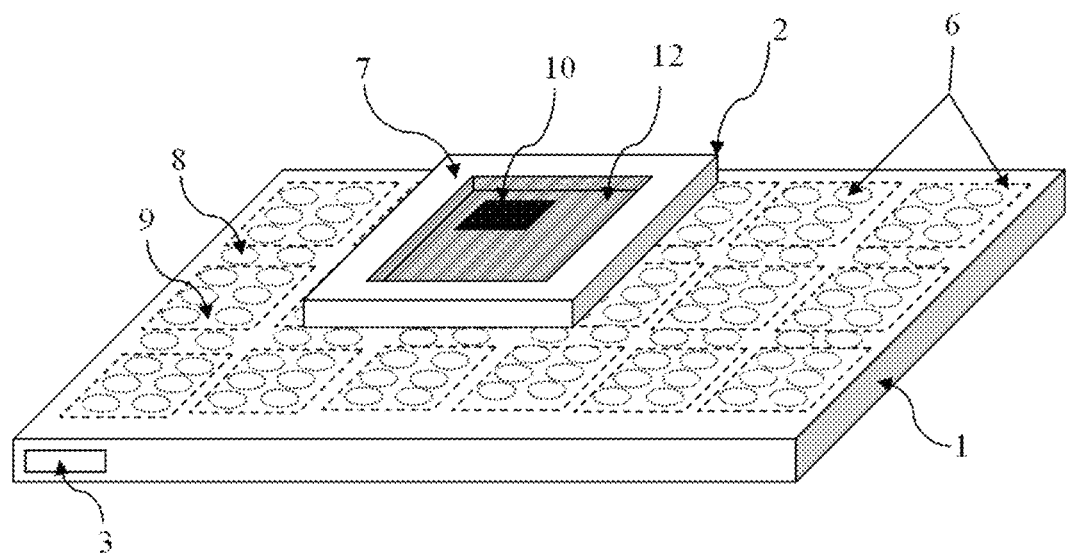
FIG. 5 is a schematic diagram illustrating an object in a card-shape that only has two external sides, in accordance with one embodiment of the present invention.
Figure 6:
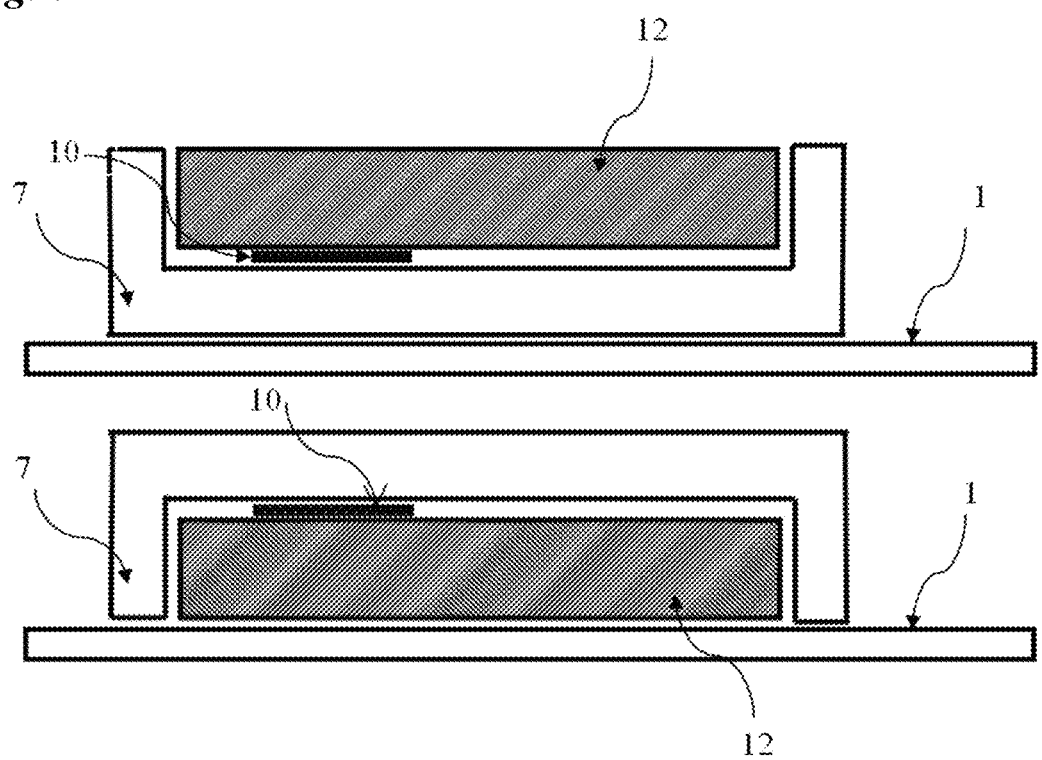
FIG. 6 is the cross-section diagram illustrating the two external sides of the card in FIG. 5 placed on the interactive surface, in accordance with one embodiment of the present invention.

As shown in FIG. 5 and FIG. 6, the object 2 is a card having a first external side made with regular plastic, and a cap made with electrically poorly conductive material 7 that forms a second external side and encompasses the edge of the first external side.

When the first external side is in contact with the interactive surface 1, the electrically poorly conductive material 7 that encompasses the edge of the first external side is also in contact with the interactive surface 1. The processor detects a capacitance value generated from the capacitive coupling between the first external side (also including the electrically poorly conductive material 7) and the array of capacitive sensors 8.

Once the second external side of the card is placed on the interactive surface 1, only electrically poorly conductive material 7 is in touch with the interactive surface 1. The processor detects a capacitance couple value generated from the capacitive coupling between the electrically poorly conductive material 7 and the array of capacitive sensors 8.

The array of capacitive sensors 8 detects different capacitive coupling values and transmits these values to the processor, and the processor stores the values in the memory. When an external side 4 of object 2 is in touch with the interactive surface 1 again, the processor can recognize the external side 4 by comparing the new capacitive coupling value with the values stored in the memory.

Figure 3:
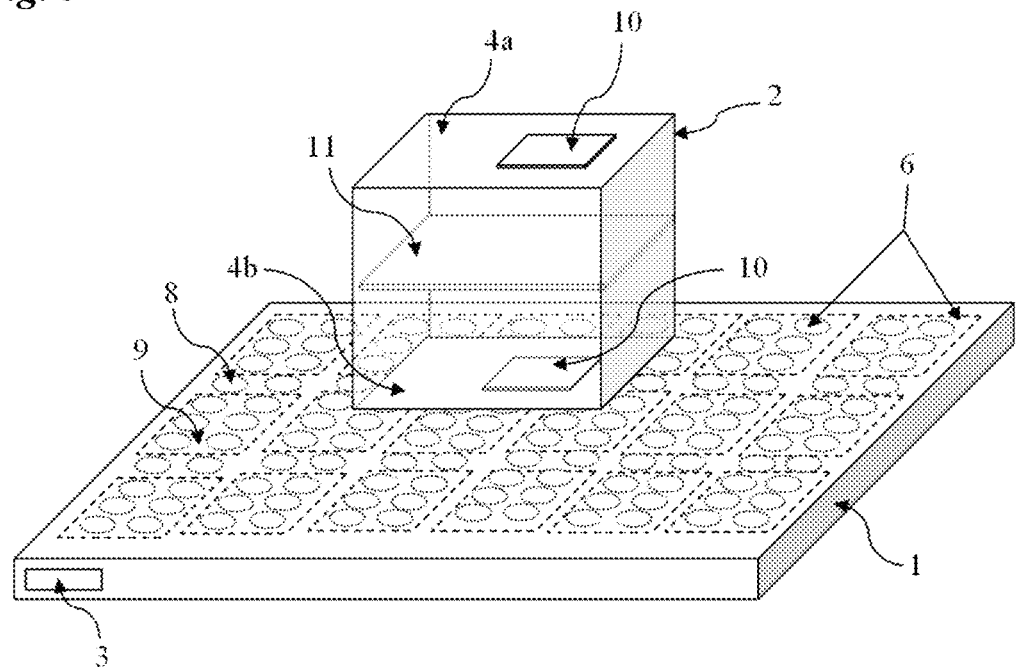
FIG. 3 is a schematic diagram illustrating the object's multiple external sides, each embedded with an RFID tag, in accordance with one embodiment of the present invention.

In FIG. 5 and FIG. 6, an RFID tag 10 is used to identify different objects 2 on interactive surface 1. And each external side 4 of the object 2 can be embedded with an RFID tag 10 for its identification, as shown in FIG. 3. The array 6 of sensors is now an array of RFID readers. Each of the RFID tags 10 is partially shielded with an electromagnetic shield such that, when an external side 4 is in contact with the interactive surface 1, only the RFID tag 10 embedded in this particular external side 4 is detected by the RFID reader. The processor derives the orientation of the object 1 based on the identification value.

As shown in FIG. 3, the electromagnetic shield could be electromagnetic wave-absorbing material, metal sheets, or conductive plastic sheets. With the electromagnetic shield, when the array 6 of sensors on interactive surface 1 detects the RFID tag 10 embedded in the external side 4a, the RFID tag 10 embedded in another external side (e.g., the external side 4b) will not be read by mistake. This is similar to the material coated on the surface of a stealth fighter, which absorbs most of the electromagnetic wave, and reflects the rest of the electromagnetic wave, making assembly unit coated with the electromagnetic shield undetectable.

With each external side of the object 2 embedded with an RFID tag, and the identification value of each external side being unique, the processor can recognize the orientation of the object 2 placed on an interactive surface 1.

A method for recognizing the orientation of an object 2 on an interactive surface 1 is as follows:

Step 1: placing the object 2 on the interactive surface 1, and the object 2 includes multiple external sides 4, and each external side 4 is visually marked with an indicator;

Step 2: detecting, by the array 6 of sensors, an identification value of the external side 4 being in touch with the interactive surface 1;

Step 3: transmitting, by the array 6 of sensors, the identification value to the processor;

Step 4: deriving, by the processor, the orientation of the object 2 based on the identification value;

Step 5: directing, by the processor, an output module 3 to provide the corresponding output information based on the orientation of the object 2.

In step 2, if the array 6 of sensors is an array of capacitive sensors 8, the identification value is a set of capacitance values.

Also in step 2, if each external side of the object 2 is embedded with an RFID tag, an RF reader 9 detects the RFID tag embedded in each external side 4.

After the array 6 of sensors recognizes the orientation of the object 2, the processor directs the output module 3 to provide the corresponding output information. In step 5, the processor may call an audio file from the memory, and asks the player a question through an audio player.

The invention claimed is:

1. A system for recognizing orientation of an object placed on an interactive surface, comprising:
   an interactive surface,
   a processor operatively linked to the interactive surface,
   an array of sensors operatively linked to the processor,
   an object comprising a plurality of external sides, wherein each external side is visually marked with an indicator,
   wherein, upon the object being placed on the interactive surface, the array of sensors detects an identification value of the external side in touch with the interactive surface and transmits the identification value to the processor, and the processor is configured to derive the orientation of the object based on the identification value.

2. The system of claim 1, wherein the external side of the object comprises an electrically poorly conductive material, the array of sensors is an array of capacitive sensors, and the identification value is a set of capacitance values, and wherein the electrically poorly conductive material contributes to differences in capacitances detected by multiple sensors due to differences in pattern and thickness of the electrically poorly conductive material distributed throughout the external side of the object, and wherein electrical resistance of the electrically poorly conductive material is set within a certain range, such that, a finger touch on the object enables the external side not in touch with the interactive surface to capacitively couple with the array of sensors via the electrically poorly conductive material.

3. The system of claim 1, wherein each external side of the object is embedded with an RFID tag, the array of sensors is an array of RFID readers, and the identification value is the ID of an RFID tag, and wherein, each RFID tag is partially shielded with an electromagnetic shield such that, upon an external side being in contact with the interactive surface, only the RFID tag embedded in that particular external side is detected by the RFID reader.

4. The system of claim 3, wherein, the electromagnetic shield is selected from the group consisting of electromagnetic wave-absorbing material, metal sheets, and conductive plastic sheets.

5. A method for recognizing the orientation of an object on an interactive surface, comprising:
   placing an object on an interactive surface, wherein the object comprises a plurality of external sides, and each external side is visually marked with an indicator, detecting, by an array of sensors, an identification value of the external side being in touch with the interactive surface, transmitting, by the array of sensors, the identification value to the processor, deriving, by the processor, the orientation of the object based on the identification value.

6. The method of claim 5, wherein the external side of the object comprises an electrically poorly conductive material, the array of sensors is an array of capacitive sensors, and the identification value is a set of capacitance values, and wherein the electrically poorly conductive material contributes to differences in capacitances detected by multiple sensors due to differences in pattern and thickness of the electrically poorly conductive material distributed throughout the external side of the object, and wherein electrical resistance of the electrically poorly conductive material is set within a certain range, such that, a finger touch on the object enables the external side not in touch with the interactive surface to capacitively couple with the array of sensors via the electrically poorly conductive material.

7. The method of claim 5, wherein each external side of the object is embedded with an RFID tag, the array of sensors is an array of RFID readers, and the identification value is the ID of an RFID tag, and wherein, each RFID tag is partially shielded with an electromagnetic shield such that, upon an external side being in contact with the interactive surface, only the RFID tag embedded in that particular external side is detected by the RFID reader.

8. The method of claim 7, wherein, the electromagnetic shield is selected from the group consisting of electromagnetic wave-absorbing material, metal sheets, and conductive plastic sheets.

* * * * *